United States Patent [19]
Burtis et al.

[11] 3,799,565
[45] Mar. 26, 1974

[54] RECREATION VEHICLE

[76] Inventors: Wilson A. Burtis, 5011 Harvard Ave., Westminster, Calif. 92683; Thomas T. Omori, 1601 Parway Dr., Glendale, Calif. 91206

[22] Filed: May 23, 1972

[21] Appl. No.: 256,088

[52] U.S. Cl................. 280/16, 9/310 C, 180/5 R, 280/111
[51] Int. Cl............................................ B62b 13/04
[58] Field of Search............. 280/16, 21 R; 180/5 R

[56] References Cited
UNITED STATES PATENTS
| | | | |
|---|---|---|---|
| 3,540,750 | 11/1970 | Berger | 280/16 |
| 3,643,978 | 2/1972 | Westberg | 280/28 |

FOREIGN PATENTS OR APPLICATIONS
| | | | |
|---|---|---|---|
| 1,032,750 | 4/1953 | France | 280/21 A |

*Primary Examiner*—Robert R. Song

[57] ABSTRACT

A recreation vehicle that may be selectively modified for use on land, water, or on a snow or ice-covered ground surface. The vehicle is adapted to have power means removably attached thereto as a source of motive power. The vehicle may be used on downwardly sloping land or snow or ice-covered surfaces without power means.

The vehicle includes a seat-supporting frame assembly that is so operatively associated with a pivotally movable, forwardly disposed first means for movably engaging the supporting surface and laterally spaced second and third means that serve the same function, that as the vehicle is guided into a curved course the first, second and third means are moved in unison to tilted positions to obtain maximum tractive engagement with the supporting surface. When the vehicle is pursuing a straight course the first, second and third means are maintained in parallel relationship with one another. The power means used in driving the vehicle on a snow or ice-covered surface includes an externally cleated, endless, surface-engaging belt that extends longitudinally relative to the frame assembly, and is so supported from the frame assembly as to not tilt laterally thereto with said first, second and third means when the vehicle traverses a curved path. The first, second and third means when the vehicle is used on a snow or ice-covered surface are skis. When it is desired to use the invention on a body of water, the skis are replaced with pontoons. The vehicle may be used on land by replacing the skis with rotatably supported wheels. A power-operated pump may be removably attached to the vehicle when it is supported on pontoons to propel it over a body of water.

6 Claims, 14 Drawing Figures

PATENTED MAR 26 1974 3,799,565
SHEET 3 OF 4
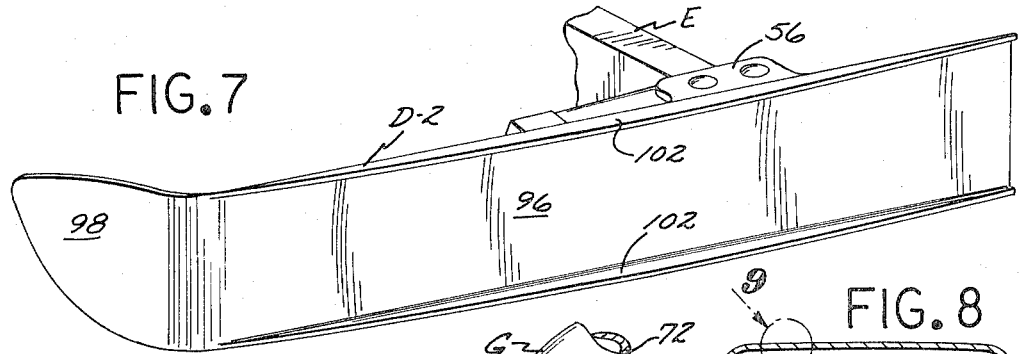
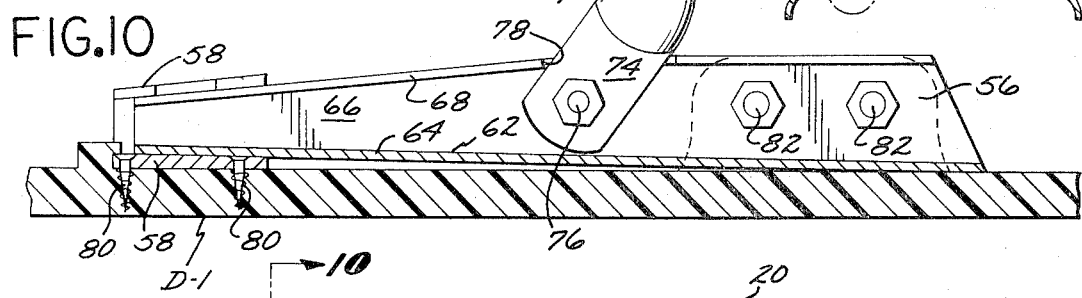
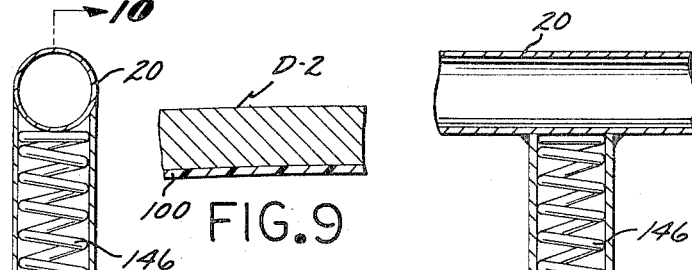
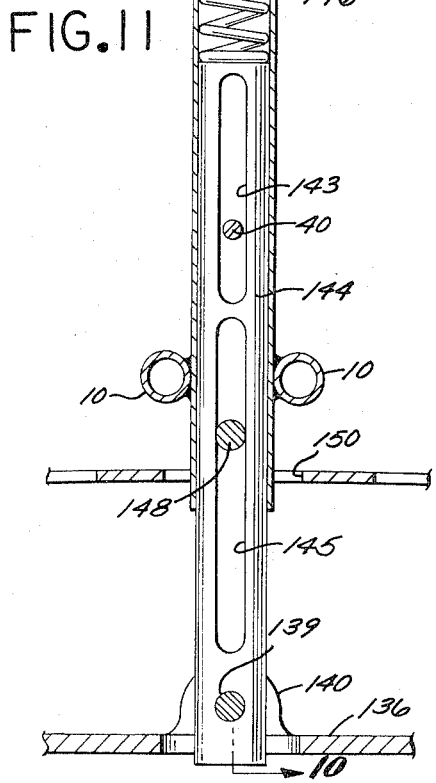
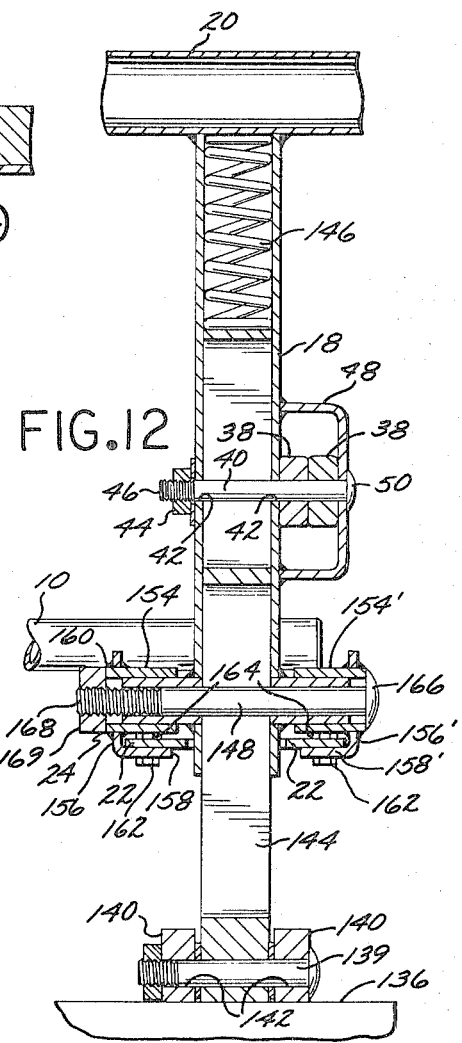

RECREATION VEHICLE

CROSS REFERENCE TO RELATED APPLICATIONS

Application Ser. No. 81,363, filed Oct. 16, 1970, entitled ARTICULATED SNOW VEHICLE, which will issue May 23, 1972, as Pat. No. 3,664,446.

BACKGROUND OF THE INVENTION

1. Field of the Invention:
Recreation vehicle.
2. Description of the Prior Art:

Although numerous recreation vehicles have been devised and marketed in the past, such vehicles, with the exception of the invention disclosed and claimed in our co-pending application, have tended to be unstable in maneuvering sharp curves.

The primary purpose in devising the present invention is to supply a recreation vehicle that substantially overcomes this operational disadvantage of prior art recreation vehicles, as well as to provide a vehicle that may be either gravity operated on a sloping surface or motor driven, as well as providing a vehicle that may be selectively modified to operate on land, water or an ice or snow-covered surface.

SUMMARY OF THE INVENTION

The recreation vehicle comprises a frame assembly that includes a first elongate rigid member that has an upwardly extending sleeve mounted on a first forward end thereof, and a tubular upright secured to a second rearward end thereof. A second elongate member is disposed above said first member, with the forward end of the second member secured to the sleeve and the rearward end affixed to the top of the upright to close the same. A transverse spring is pivotally supported from the upright.

A rod is pivotally supported in the sleeve and has a handlebar or other guiding means mounted on the upper end thereof. First surface engaging means are connected to the lower end of the rod. First and second rigid legs are pivotally supported for transverse movement from opposite ends of the spring, with the legs having second and third surface engaging means mounted on the lower ends thereof. The first, second and third surface engaging means may be skis, wheels, or pontoons, depending on the type of surface on which the vehicle is to be used. A seat is supported from the upper rearward end of the frame assembly. A user may sit astride the seat and grip the handlebar to guide the vehicle. Two transverse struts are pivotally connected to the upright and to the upper ends of the legs.

When the vehicle is coasting down an inclined surface, the vehicle may be caused to pursue a curved path by pivoting the handlebars, rod, and first surface engaging means. As the vehicle curves, forces are imposed on the operator to cause him to change his position from one that is normal to the supporting surface to one where he makes a vertical angle therewith. As the operator assumes this vertical angle, the upright, seat and frame assembly, sleeve, rod and handlebar likewise assume such an angle and pivot transversely relative to the spring. The struts transfer transverse pivotal movement of the frame assembly to the legs to laterally tilt the latter.

The transverse tilting above described results in the first, second and third surface engaging means being concurrently tilted in a transverse direction to have maximum frictional contact with the supporting surface, and permit a curve to be negotiated with a minimum of transverse slippage. Should it be desired, power operated means to drive the vehicle may be removably secured thereto by causing a connecting member to engage the tubular upright.

BRIEF DESCRIPTION OF THE DRAWINGS

FIG. 7 is a partial perspective view of a second form of skis that may be used with the first form of vehicle;

FIG. 8 is a transverse, cross sectional view of the skis shown in FIG. 7;

FIG. 9 is an enlarged transverse, cross sectional view of a section of the skis shown in FIG. 1 taken within the confines of the circle defined by phantom line on that figure and identified by the numeral 9;

FIG. 10 is a partial longitudinal cross-sectional view of the foremost ski illustrated in FIG. 1;

FIG. 11 is an enlarged vertical cross-sectional view of the connection assembly used in removably securing the power operated unit illustrated in FIGS. 4 and 5 to the first form of the vehicle;

FIG. 12 is a longitudinal cross-sectional view of the assembly illustrated in FIG. 11 and taken on the line 12—12 thereof;

DESCRIPTION OF THE PREFERRED EMBODIMENTS

Figure 1:
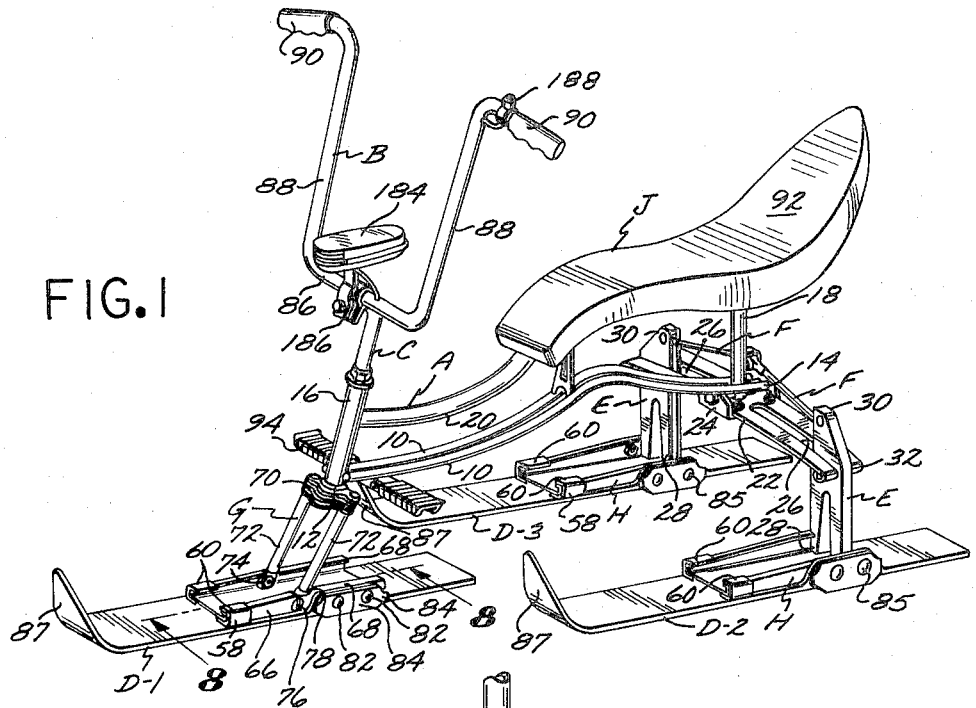
FIG. 1 is a perspective view of the first form of the vehicle that is movably supported on three skis.
Figure 2:
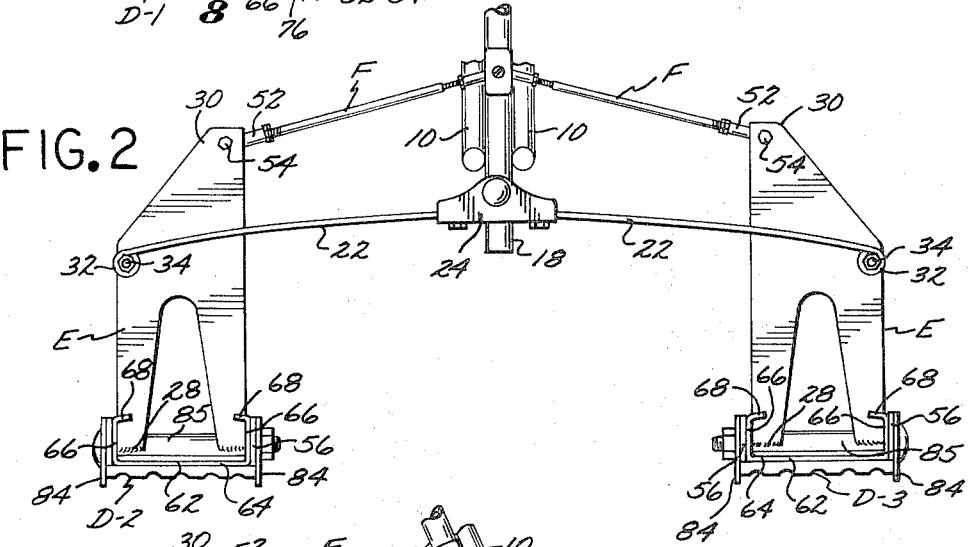
FIG. 2 is a rear elevational view of the vehicle shown in FIG. 1, and illustrates the position of the rearwardly disposed skis when the vehicle is pursuing a straight course.
Figure 3:
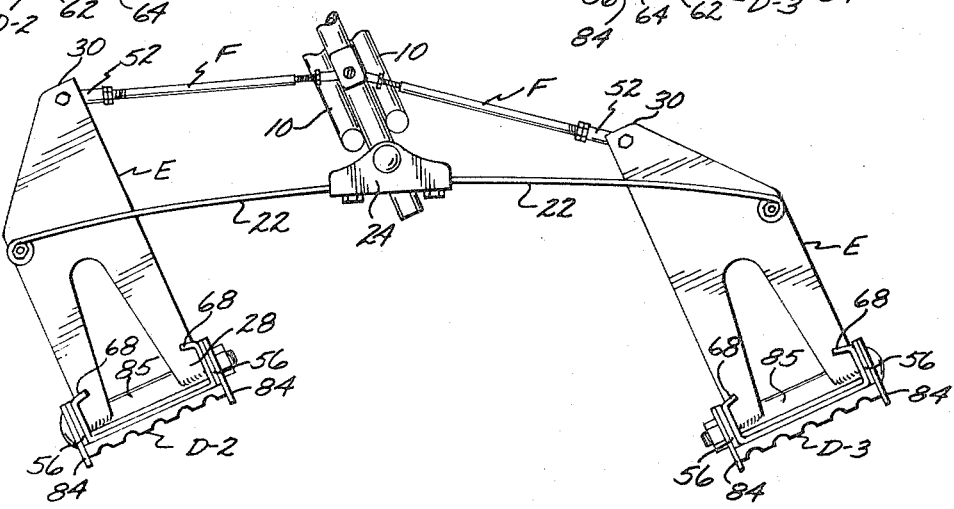
FIG. 3 is the same rear elevational view as shown in FIG. 2, but illustrating the position of the rearward skis when the vehicle is traveling in a curved path.

The first form J of the invention, as may best be seen in FIGS. 1 through 3, includes a frame assembly A. The frame assembly A includes at least one first elongate rigid member 10 that is preferably of compound curved configuration and has a first forward end 12 and second rearward end 14. In the drawings two first members 10 are shown that are disposed side by side and preferably separated to a slight degree.

An upwardly extending cylindrical sleeve 16 is secured to the first ends 12 of the members 10 and a rigid upright 18 to the second ends 14, with the upright 18 preferably being of tubular structure. A second elongate member 20 is provided that is disposed above the first member 10, and has the ends thereof secured to the sleeve 16 and the upper portion of the upright 18, as may he seen in FIG. 4. Guide means B, preferably in the form of a handlebar, are provided, and have a rod C extending downwardly therefrom that is pivotally journaled in the sleeve 16. First, second and third surface engaging means D–1, D–2, and D–3 are provided, and illustrated in FIGS. 1 through 3 as skis.

The frame assembly A, as may be seen in FIG. 1, also includes a transverse leaf spring 22 that is pivotally secured by an assembly 24 to the lower portion of the upright 18. The spring 22, as may be seen in FIG. 1, has two slots 26 that extend inwardly from opposite ends thereof. First and second legs E of identical structure are provided and have intermediate portions thereof disposed within the confines of the slots 26. Each leg E has a lower end 28 and an upper end 30. Each of the ends of the spring 22 develop into axially aligned eyes 32 that have pins 34 extending therethrough, and the pins engaging openings (not shown) in the legs E to pivotally support the legs for transverse movement from the spring within the confines of the slots 26.

Identical first and second struts F are provided, as may best be seen in FIGS. 1 through 3, that have first end portions 38, illustrated in FIG. 12, that pivotally engage a bolt 40 that extends through aligned openings 42 formed in the upright 18. The bolt 40 is held in position, as shown on FIG. 12, by a nut 44 that engages threaded end portion 46 thereof. A channel-shaped member 48 is secured to the upright 18 and has the bolt 40 extending therethrough, with the member 48, due to engagement with a head 50 of bolt 40, preventing the nut 44 being tightened to such an extent on the bolt 40 that the ends 38 of the struts F would be forced into binding engagement with one another. The struts F on their outer ends are connected to end pieces 52 that by bolts 54 are pivotally connected to the upper ends of the legs E, as best seen in FIGS. 2 and 3.

Fourth means G are provided, as may best be seen in FIG. 1, for pivotally connecting the second lower end of the rod C to the first ski D–1. Two fifth means H are also provided for pivotally connecting the lower ends of the legs E to the second and third skis D–2 and D–3, as illustrated in FIG. 1. The ski K–1, as shown in FIGS. 1–3 and 10, has two parallel laterally spaced flanges 56 that extend upwardly from the rearward portion thereof. One of the flanges 56 is shown in phantom line in FIG. 10. The ski D–1 also has an inverted channel-shaped member 58 secured to the upper surface thereof forwardly of the flanges 56, and the upper edge portion of the member 58 developing into two inwardly extending, laterally spaced ribs 60. The flanges 56 and channel-shaped members 58 are in engagement with a plate assembly 62 that includes a web 64 that has laterally spaced, parallel legs 66 extending upwardly from the longitudinal sides thereof, and the legs 66 on their upper ends developing into inwardly extending ribs 68.

The fourth means G, as shown in FIG. 1, includes a transverse cross piece 70 secured to the second end 14 of rod C, and the cross piece 70 has two downwardly and forwardly extending tubular legs 72 secured thereto, with the legs 72 on the lower ends developing into flattened portions 74 that pivotally engage bolts 76 formed intermediate the ends thereof, as may best be seen in FIG. 10, to permit the ski D–1 to pivot in a vertical plane relative to the legs 72.

The channel-shaped member 58 is preferably secured to the ski D–1 by screws 80, as shown in FIG. 10. A number of bolts 82 extend through openings in the flanges 56 and legs 66 to removably secure the ski D–1 to the plate assembly 62, as illustrated in FIGS. 1 and 10. If desired, the bolts 82 may also be applied to hold two parallel, laterally spaced side plates 84 on the ski D–1, which side plates extend downwardly below the lower surface of the ski and cut into an ice or snow surface when the ski D–1 is traveling thereover. When the ski is traveling in a straight line over the snow or ice surface, both of the side plates 84 cut into the surface, but when the ski is tilted, only one of the side plates 84 will dig into the snow or ice surace. The purpose of the side plates 84 is to prevent lateral slipping of the ski D–1 when it is pivoted on the vehicle by the guiding means B to cause the vehicle to pursue a curved path.

The skis D–2 and D–3 are of substantially the same structure as ski D–1, and are pivotally secured to the lower ends of the legs E by bolts 85, as may best be seen in FIG. 2, that extend through the legs 66 and through openings (not shown) in the legs E. The skis D–1, D–2 and D–3 each have upwardly and forwardly curved end portions 87 as shown in FIG. 1.

The guiding means B is illustrated in the drawings as being a handlebar that includes a cross piece 86 that is secured to the first end 12 of the rod C, with the cross piece having two laterally spaced L-shaped members 88 extending upwardly therefrom, which have handles 90 mounted on the upper extremities thereof. An elongate seat 92 is provided that is mounted on the upper rearward portion of the second elongage member 20 by conventional means. The seat 92 is adapted to support a user (not shown) when he is straddling the seat, and with his feet resting on the transverse footrest 94, preferably secured to the lower forward portion of the first elongate member 10.

If desired, the skis D–1, D–2 and D–3 may be formed of a metal such as aluminum, and have a lower elongate surface 96, as shown in FIG. 7, that is transversely slightly concave, the ski developing on its forward end in a conventional upturned portion 98. The skis may be formed from a metal such as aluminum or an alloy thereof, with the surface 96 having a film 100 of a fluorocarbon resin such as Teflon bonded thereto to minimize the frictional contact of the skis with the snow or ice (not shown) over which they travel. To prevent lateral sliding when the skis are subjected to a quick turn, two ribs 102 that preferably vary in depth project downwardly from the longitudinal edges of the skis, as shown in FIG. 7. Each ski has two flanges 56 that extend upwardly from the sides thereof, as previously described and as illustrated in FIG. 7.

The first form J of the device, as previously described and illustrated in FIG. 1, is of course used on a snow or ice covered inclined surace. When a user or operator of the device is straddling the seat 92 and gripping the handles 90, he is capable of guiding the vehicle over any desired course. When the user turns the guiding means B, the ski D–1 is angularly disposed relative to the skis D–2 and D–3, with the result that the vehicle is placed in a turn. The user (not shown), due to the forces imposed on him as the vehicle turns, leans into the turn, and in so doing he pivots the frame assembly A transversely relative to the spring 22, as shown in FIG. 3. As the frame assembly A so pivots, the struts F cause the legs E to pivot concurrently to the same degree, and the forward ski D–1 likewise is tilted due to the sleeve 16 being rigidly secured to the frame assembly.

In FIG. 3 it will be seen that skis D–2 and D–3 are caused to dig into the snow due to one of the edge surfaces of each ski contacting the same, and lateral slipping of the vehicle J as it traverses a curve is minimized. Slippage of the skis D-1, D-2 and D-3 is further minimized when the skis have the side plates 84 operatively associated therewith, as shown in FIG. 3. The skis D-1, D-2 and D-3 not only pivot transversely in unison, but the skis are free to independently pivot in longitudinal extending vertical planes.

Figure 4:
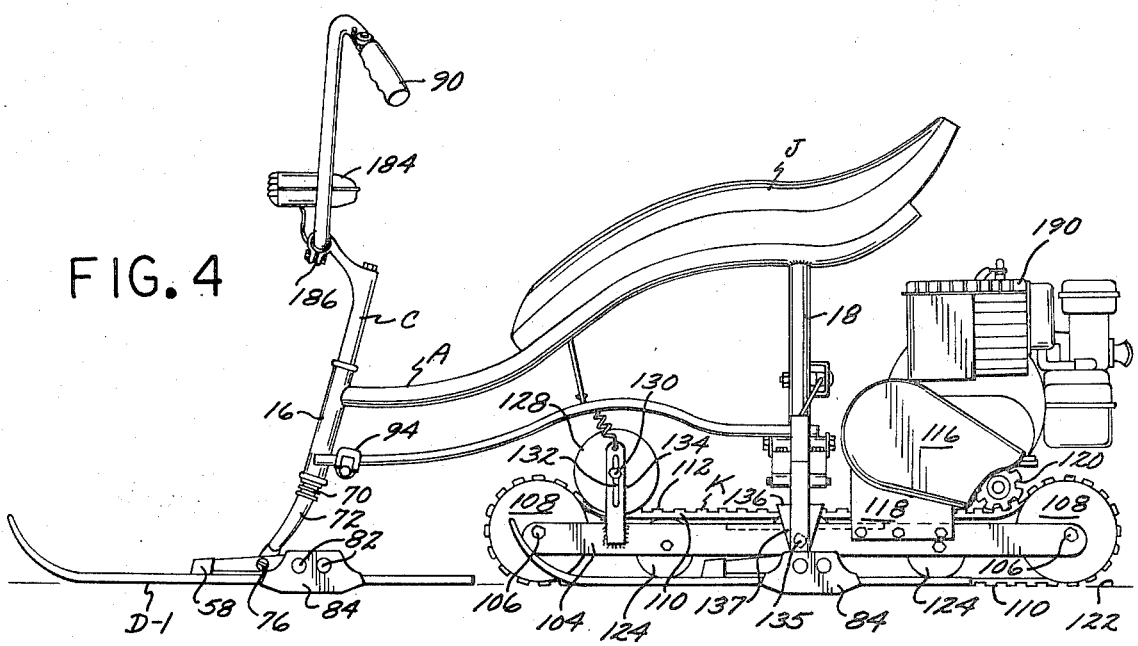
FIG. 4 is a side elevational view of the vehicle shown in FIG. 1, but with a power operated unit removably secured thereto to propel the device.
Figure 5:
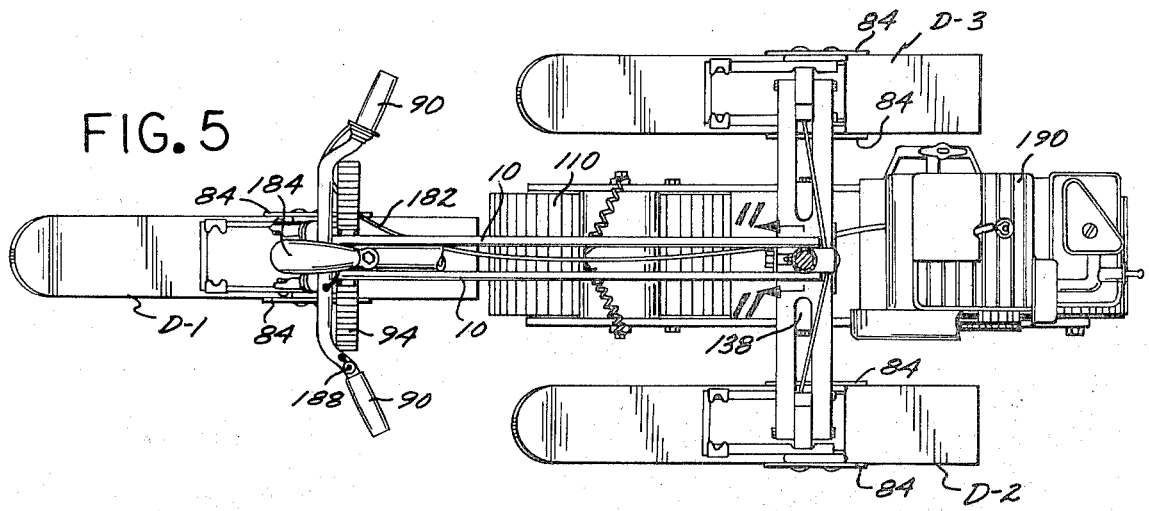
FIG. 5 is a top plan view of the vehicle shown in FIG. 4.
Figure 6:
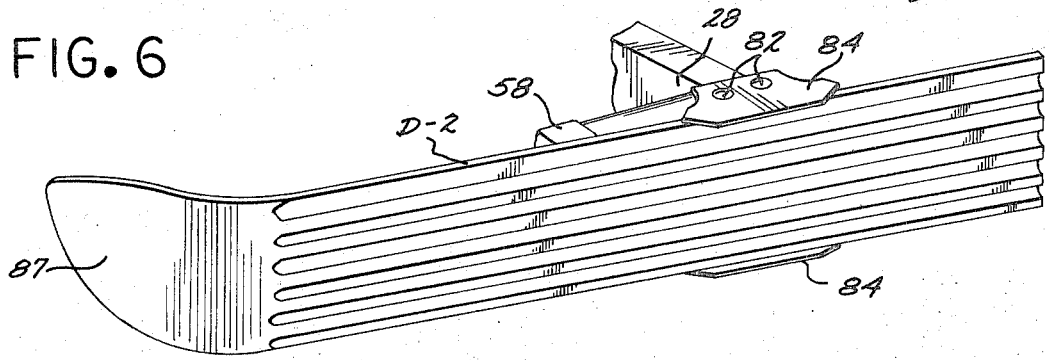
FIG. 6 is a partial perspective view of one of the skis and side plates used on the first form of the vehicle.

Motive power to propel the vehicle J may be supplied by the unit K that is removably attachable to the vehicle. The unit K, as best seen in FIGS. 4 and 5, includes two parallel, laterally spaced side pieces 104 that have transverse shafts 106 at the forward and rearward ends thereof, with the shafts 106 rotatably supporting two rollers 108. An endless resilient belt 110, preferably formed from a reinforced rubber-like material, is provided that engages the rollers 108, the belt having a number of longitudinally spaced, transversely extending cleats 112 defined on the exterior surface thereof. An internal combustion engine 116, or other power generating means, is supported by a bracket 118 from the side pieces 104, and the engine driving a sprocket 120 that engages the cleats 112 to drive the belt 110. The cleats 112 on the lower reach of the belt are in frictional contact with the snow or ice surface 122. The lower reach of the belt is maintained in substantially flat contact with the surface 122 by the rollers 108 and idling rollers 124 that are rotatably supported from the side pieces 104 on shafts 126. The idler rollers 124 are intermediately positioned relative to the rollers 108. Tension is maintained on the belt 110 by a roller 128 that is rotatably supported on a shaft 130 that is slidably movable in a vertically extending slot 132 forming in uprights 134 that are secured to the side pieces 104. Locking means (not shown) maintain the shaft 130 at a desired elevation on the uprights 134 to urge the roller 128 into pressure contact with the belt 110 to a desired degree. The degree of pressure contact, of course, will control the tension maintained on the belt 110.

An inverted channel-shaped cross piece 136 is provided that includes a web 138, and that extends between the side pieces 104, with the web being situated above the upper reach of the belt 110. Cross piece 136 includes two laterally spaced legs 137 that are pivotally connected to side pieces 104 by bolts 135.

The web 138, as may best be seen in FIGS. 11 and 12, has two spaced lugs 140 projecting upwardly therefrom, which lugs have aligned openings 142 formed therein. An elongate connecting member 144 is provided that has two longitudinally extending slots 143 and 145 formed therein, with the connecting member 144 being slidably movable within the tubular upright 18. The lower end of connecting member 144 is pivotally connected to lugs 140 by a pin or bolt 139, as shown in FIGS. 11 and 12, that engages openings 142. A compressed helical spring 146 is situated within the upper confines of the upright 18, with the upper end of the spring 146 bearing against the rearward portion of the elongate member 20 and the lower end of the spring being in pressure contact with the connecting member 144. The bolt 40, as may be seen in FIG. 11, extends through the slot 143.

The first slot 143 is slidably engaged by the bolt 40, as may best be seen in FIG. 12. Second slot 145 is slidably engaged by a bolt 148 that forms a part of the assembly 24 that pivotally connects the upright 18 to the spring 22. The spring 22, as can best be seen in FIGS. 11 and 12, has a centrally disposed slot 150 therein.

Assembly 24 includes first and second axially aligned tubular stub shafts 152 and 152', as may be seen in FIG. 12, that extend from the upright 18 in the same direction as the first and second elongate members 10 and 20. The stub shafts 152 and 152' are rotatably engaged by two tubular bearings 154 and 154' that are axially aligned and extend inwardly towards one another, as shown in FIG. 12. The tubular bearings 154 and 154' are secured to first and second vertically disposed plates 156 and 156', which plates on the lower ends thereof support inwardly extending first and second flanges 158 and 158'. The first plate 156, by welding means 160, is secured to the lower elongate member 10, as shown in FIG. 12. The flanges 158 and 158' have openings extending therethrough, as does the spring 22, through which bolts 162 extend that engage nuts 164 to removably secure the flanges 158 and 158', plates 156 and 156', and bearings 154 and 154' together to define the assembly 24.

The bolt 148, as may best be seen in FIGS. 11 and 12, snugly and slidably engages the slot 145. The bolt 148 includes a head 166 that is in abutting contact with the outer extremity of the bearing 154', with the bolt having threads 168 on the opposite end thereof that engage a nut 169 to hold the bolt in a fixed position on the assembly 24 and in sliding engagement with second slot 145. Due to the bolt 148 slidably engaging the slot 145, the connecting member 144 is held at a non-rotatable position relative to the upright 18. Thus, the power operated unit K is at all times maintained in a position parallel to the skis D-1, D-2 and D-3. Due to the unit K being pivotally connected to the lower end of the connecting member 144 by the bolt 139, the connecting member 144 and upright 18 may pivot laterally as the vehicle J pursues a curved path, but without the unit K being tilted to remove the lower reach of the belt 110 from full surface contact with the snow or ice surface 122. The unit K may pivot longitudinally independent of skis D-2 and D-3 due to the cross piece 136 being connected to the side members 104 by pins or bolts 135 shown in FIG. 4. Tensioned springs 133 shown in FIGS. 4 and 5 tend at all times to pivot the unit K in a clockwise direction to force the rearward portion of lower belt reach 110 into maximum pressure contact with surface 122.

The form of the invention shown in FIGS. 4 and 5 operates substantially in the same manner as the vehicle illustrated in FIG. 1, other than that the first mentioned power operated vehicle is not restricted to being used on an inclined surface, but may operate equally well on a flat surface.

One of the handles 90, as may best be seen in FIG. 5, is rotatably supported on one of the handlebar portions 88, and when rotated actuates a flexible cable 182 that extends to the engine 116 to control the rate of operation of the latter. If desired, an electrically operated horn 184 may be removably mounted on the handlebar crosspiece 86, as shown in FIG. 1, by a conventional clamp 186, and the actuation of the horn 184 being controlled by a pushbutton type switch 188 mounted on one of the handlebar portions 88.

Figure 13:
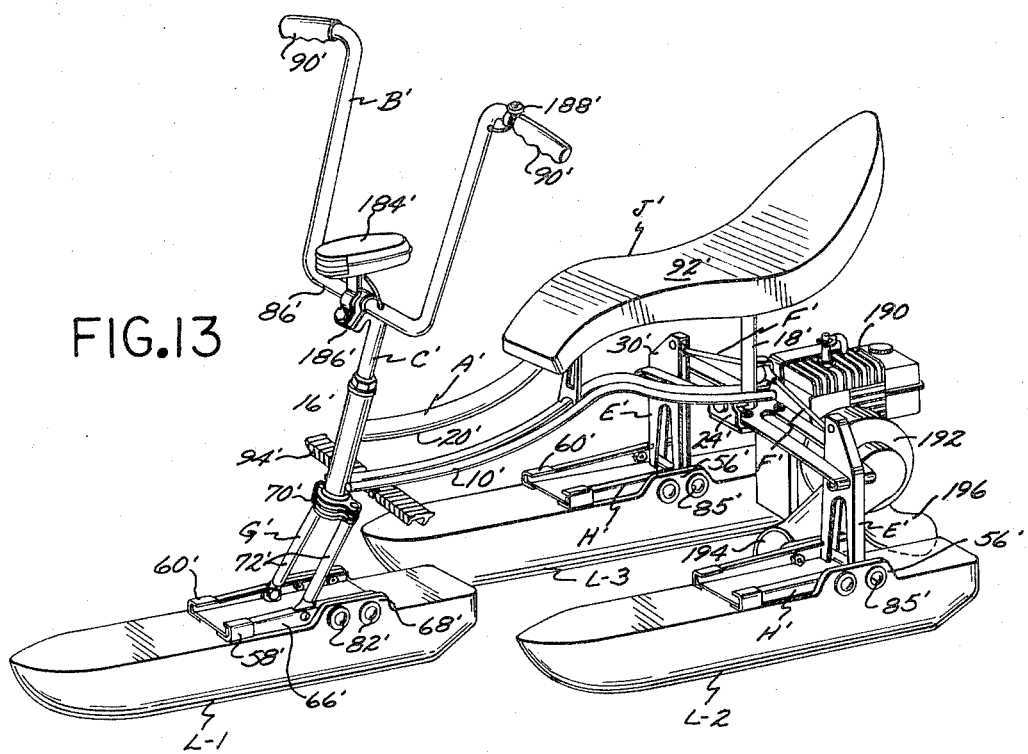
FIG. 13 is a perspective view of a second form of the vehicle.

The first form J of the vehicle if desired may be modified to the form J' shown in FIG. 13, which is adapted for use on a body of water. Elements common to both the form J and second form J' are identified on the drawing on FIG. 13 by the same letters and numerals previously used, but with primes being added thereto.

The skis D-1, D-2 and D-3 in the first form of the vehicle J are in the second form of the vehicle J' replaced by elongate pontoons L-1, L-2 and L-3, with the pontoons being removably secured to the vehicle by the same means used in securing the skis to the first form J. The second form J' of the vehicle includes an internal combustion engine 190 that drives a pump 192 that is situated between the pontoons L-2 and L-3, with the pump including a water intake 194 and a discharge 196. Water is ejected as a jet from the discharge 196 and serves to propel the vehicle J' forwardly, when the vehicle is supported on an upper surface of the body of water due to the buoyancy of the pontoons L-1, L-2 and L-3. By pivoting the pontoon L-1 by use of the guiding means B', the vehicle J' may be caused to pursue a desired path on the body of water. The pontoons L-1, L-2 and L-3 are tilted concurrently in the same direction as the vehicle traverses a curved path in the same manner as the skis D-1, D-2 and D-3 are tilted in the first form J of the invention.

Figure 14:
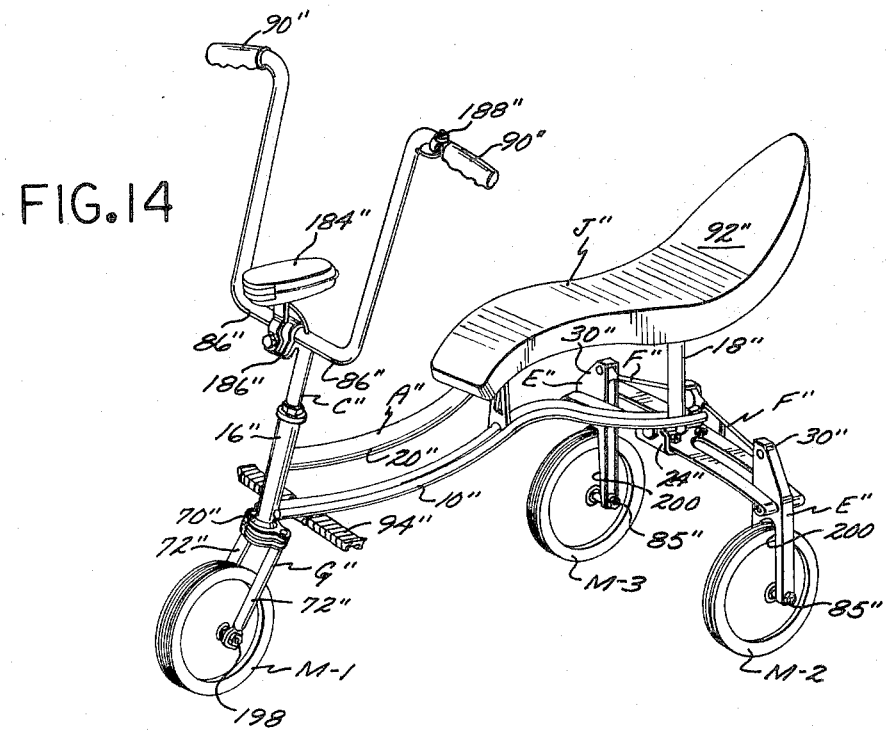
FIG. 14 is a perspective view of a third form of the vehicle.

If desired, the first form J of the vehicle may be modified to the third form J" shown in FIG. 14. Elements of the third form J" common to the first form J are identified by the same numerals and letters previously used, but with double primes being added thereto.

The third form of the invention J" includes first, second and third wheels M-1, M-2 and M-3, that replace the skis D-1, D-2 and D-3. After the ski D-1 has been removed from the vehicle J, a bolt 198 with an engaging nut (not shown) is extended through the openings in the lower portions of the legs 72" that are adapted to be engaged by the bolts 76". Bolt 198 rotatably supports the first wheel M-1. The skis D-2 and D-3 are removed from the first form J of the vehicle and bolts 85" are utilized to rotatably support the wheels M-2 and M-3 from the legs E", with the wheels M-2 and M-3 extending upwardly into vertical slots 200 formed in the legs E", which slots are shown in the legs E in FIG. 1 but not identified by numerals therein.

The third form J" of the vehicle is used on a downwardly inclined surface, with the user by use of the guiding means B" directing the vehicle along a desired course. The wheels M-1, M-2 and M-3 tilt in unison when the third form J" of the vehicle is traversing a curve for the same reasons as previously mentioned in connection with the first form J of the invention. The chief difference in the third form J" of the vehicle from the first form J is that in the third form wheels are used to movably engage a ground surface while in the first form J the skis D-1, D-2 and D-3 engage an ice or snow-covered surface. The structure of ski D-2 shown in FIG. 7 may be incorporated into the design of conventional skis if desired. The portion of the ski D-2 forwardly and rearwardly of flanges 56 may be of maximum width.

The use and operation of the various forms of the invention shown in the drawings have been described previously in detail and need not again be repeated.

We claim:

1. A recreation vehicle capable of being steered by an operator in a desired course over a supporting surface, said device including:

a. a frame assembly that includes at least one first elongate member having first and second ends, an upwardly extending cylindrical sleeve secured to said first end, a rigid upright secured to said second end, a transverse substantially horizontal leaf spring pivotally connected at substantially the center thereof to said upright by pivotal means, and a second elongate member disposed above said first member and having the ends thereof rigidly connected to said sleeve and an upper portion of said upright;

b. manually operated guiding means disposed above said sleeve;

c. a rod pivotally supported in said sleeve, said rod having a first upper end and a second lower end, said first end secured to said guiding means;

d. first, second and third means for movably engaging said supporting surface;

e. a pair of vertically extending, laterally spaced legs pivotally supported for transverse movement only from the ends of said spring, each of said legs having upper and lower ends;

f. a pair of transverse struts pivotally connected to said upright and to said ends of said legs to pivot said legs in unison with the pivotal movement of said upright relative to said spring;

g. fourth means for connecting said first means to said second end of said rod;

h. fifth means for connecting said second and third means to said lower ends of said first and second legs; and i. a seat mounted on the upper rearward portion of said frame assembly for supporting a user of the device, with said user when he turns said guide means when said vehicle is moving causing said vehicle to traverse a curve into which said user leans due to forces imposed on said user, and as said user so leans he pivots said frame assembly transversely relative to said spring, with said struts, sleeve, rod, first means and said legs concurrently cooperating to tilt said first, second and third means laterally to the same degree as said frame assembly tilts.

2. A recreation vehicle as defined in claim 1 in which said first, second and third means are elongate skis, said surface is snow or ice, and said fourth and fifth means so connect said first, second and third skis to said rod and pair of legs that said skis may pivot independently in vertical planes as said vehicle travels over rough terrain, and said fifth means at all times maintaining said second and third skis parallel to one another.

3. A recreation vehicle as defined in claim 2 which in addition includes:

j. a plurality of pairs of side plates disposed on opposite sides of said skis and extending therebelow; and k. sixth means for removably holding said side plates in fixed positions on said skis, with one of said side plates in each of said pairs biting into said snow or ice surface as said vehicle traverses a curve thereon and said skis tilt transversely, and said biting minimizing lateral sliding movement of said vehicle relative to said snow or ice surface.

4. A recreation vehicle as defined in claim 2 in which at least a portion of said skis are metal and each of which has a transversely curved concave lower surface, and said lower surface prtially defined by two transversely spaced, longitudinally extending ribs that form an integral part of the ski, and said ribs tending to minimize lateral slipping of said vehicle on said snow or ice surface when said vehicle traverses a curved path thereon.

5. A recreation vehicle as defined in claim 4 which in addition includes:
j. a film of a polymerized resin that covers said concave lower surface to minimize the coefficient of friction between said skis and said now or ice surface.

6. A recreation vehicle as defined in claim 5 in which said polymerized resin is a fluoro-carbon resin.

* * * * *